Apr. 3, 1923.
F. F. WUNDER
1,450,316
CLUTCH HOLDER
Filed Nov. 2, 1921
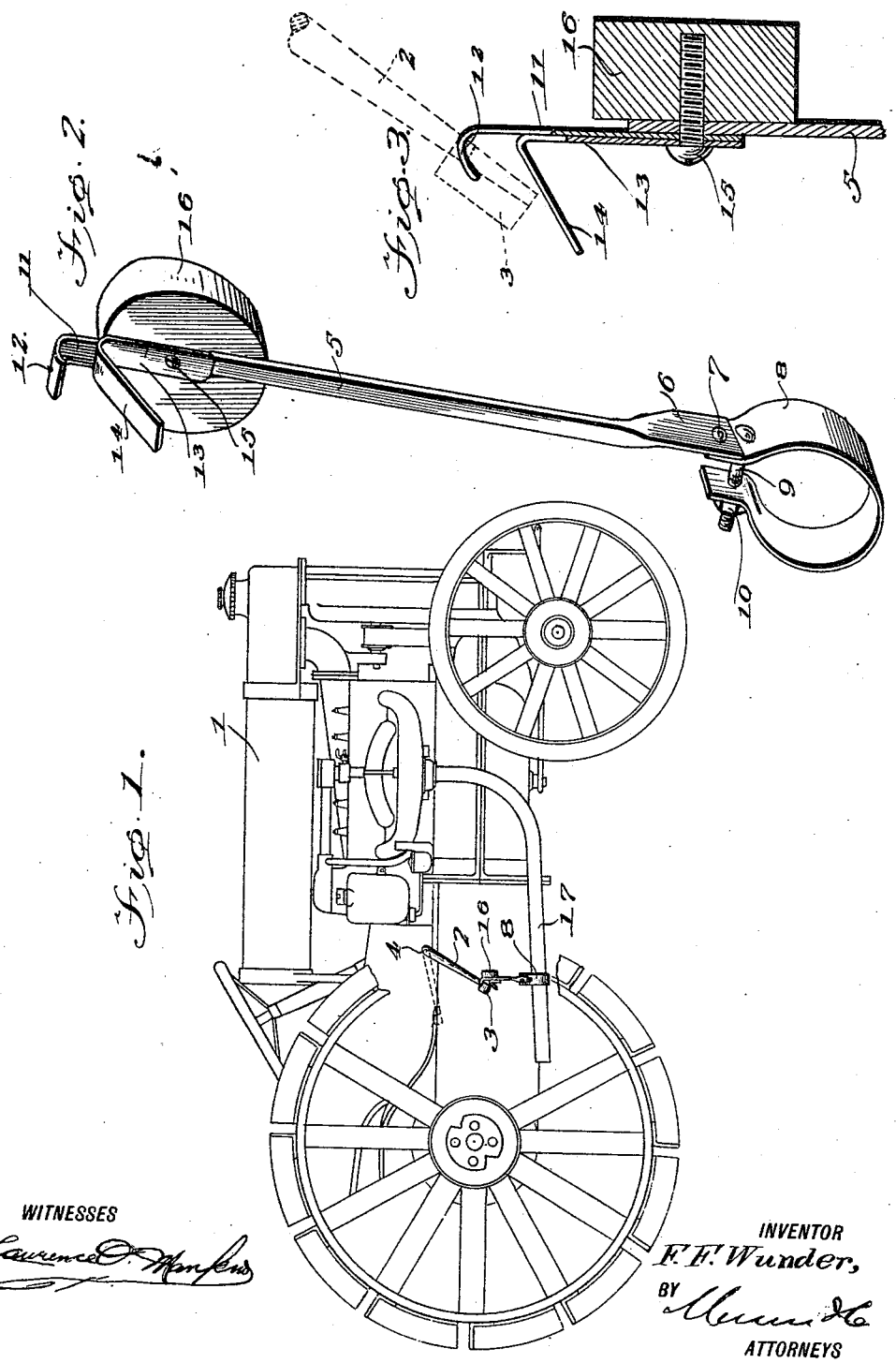
WITNESSES
INVENTOR
F.F. Wunder,
BY
ATTORNEYS Patented Apr. 3, 1923.

1,450,316

UNITED STATES PATENT OFFICE.

FRANK FREDERICK WUNDER, OF VALLEY FALLS, KANSAS.

CLUTCH HOLDER.

Application filed November 2, 1921. Serial No. 512,236.

*To all whom it may concern:*

Be it known that I, FRANK FREDERICK WUNDER, a citizen of the United States, and a resident of Valley Falls, in the county of Jefferson and State of Kansas, have invented certain new and useful Improvements in Clutch Holders, of which the following is a specification.

My invention relates to improvements in devices for holding clutch control levers, and it consists in the combinations, constructions and arrangements herein described and claimed.

An object of my invention is to provide a novel attachment for a tractor whereby a clutch control lever may be releasably held in position to occasion the releasing of the driving connection between the engine of the tractor and the transmission thereof, without disengaging the gears of the transmission.

A further object of my invention is to provide an attachment of the character described, that is adapted for application to a tractor of ordinary construction without any change in the structure of the tractor being required.

A further object of my invention is to provide a device of the character described having means for engaging a clutch control lever when the latter has been depressed into position to occasion the releasing of the driving connection between the engine of the tractor and the transmission, and for causing said clutch control lever to be disengaged from the device when further depressed.

Other objects and advantages will appear in the following description, and the novel features of the invention will be pointed out more particularly in the claims.

My invention is illustrated in the accompanying drawings, forming a part of this application, in which:

Fig. 1 is a side elevation of a tractor equipped with my invention,

Fig. 2 is an enlarged perspective view of the holder detached from the tractor, and Fig. 3 is a sectional view of a fragmentary portion of the holder, a portion of a clutch control lever being indicated by the dotted lines.

Referring now to the drawings, 1 denotes a tractor of a well known type of construction. A clutch control lever 2 having a foot engaging portion 3 is pivotally supported at 4 for movement from the dotted line position shown in Fig. 1, to and slightly beyond the full line position indicated in the same figure. The clutch control lever 2 is under the control of the usual means (not shown) for yieldingly maintaining it in the dotted line position.

The parts described so far are ordinary in construction and form no part of my invention except in so far as they cooperate with the parts which will now be described.

The holder comprises a body 5 which is made of a material having inherent spring qualities, such as steel, and which preferably has the form of a bar, as shown. The body 5 has a twisted portion 6 at one end, rigidly attached by bolts 7 or like fastening means to a clamping ring 8. The clamping ring 8 is of the split ring type and the end portions thereof are connected by a bolt 9 having an adjusting nut 10 screwed thereon.

A lever holding member has a straight shank portion 11 formed integrally at one end with a hook portion 12. A releasing member embodied in the invention has a straight shank portion 13 having an integral portion 14 merged thereinto at an acute angle adjacent to one end. The shank portions 11 and 13 are attached to the body 5 adjacent to the end thereof opposite that provided with the clamping ring 8 through the agency of a screw 15 which engages a weight 16, as shown. The weight 16 serves as a retaining member and engages the screw 15 to prevent the displacement of the shank portions 11 and 13. The weight 16 has an additional function as will be pointed out hereinafter.

From the foregoing description of the various parts of the device, the operation thereof will be readily understood. It is to be observed that the shank portions 11 and 13 are held substantially in alinement with the body 5 and that the shank portion 11 is disposed between the shank portion 13 and the adjacent face of the body 5. The length of the downwardly inclined portion 14 of the releasing member is greater than that of the hook portion 12 of the holding or catch member.

In service, the clamping ring 8 is attached to a fixed part of the tractor, as, for instance, to the exhaust conduit of the engine, as indicated at 17. The body 5 will thus be positioned substantially perpendicular, with the catch and release members, which have been described in the foregoing, repositioned in the arc described by the foot engaging portions 3 of the clutch control lever 2 when the latter is moved downwardly about its pivotal connection at 4. When the clutch control lever 2 has been depressed in the usual manner, to the position indicated by the full lines in Fig. 1, the foot engaging portion 3 will be moved into engagement with the hook portion 12 of the holding or catch member. The clutch control lever 2 will thus be held in position to occasion the releasing of the driving connection between the engine of the tractor and the transmission, with the necessity for disengaging the gears of the transmission obviated. The operator may then leave the tractor while the engine is running, for performing duties ordinarily incident to the operation of a tractor. When the operator wishes to again establish the driving connection between the engine and the transmission, a sharp blow is struck against the foot engaging portion 3 with the foot, thereby driving the foot engaging portion forcibly against the downwardly inclined portion 14 of the releasing member. Since the body 5 is made of a material having inherent spring qualities, the upper part of the attachment will be sprung away from the foot engaging portion 3 by the impact of the blow, and at the same time, the downwardly inclined portion 14 will guide the foot engaging portion 3 out of engagement with the hook portion 12. The weight 16 serves to amplify the length of the arc described by the upper end portion of the attachment on account of the impact of the blow delivered thereto by the foot engaging portion 3 against the downwardly inclined portion 14 of the releasing member and the clutch control lever 2 will have been returned into normal engaged position, indicated by the dotted lines in Fig. 1, before the free end portion of the body 5, which carries the weight 16, swings back to normal position.

It will therefore be obvious that a clutch control lever of a tractor equipped with my invention may be instantly moved into disengaged position, in which position it will be caught and held by the catch member of the device, and that the clutch control lever may be instantly disengaged from the catch member of the device and permitted to return to normal engaged position.

I claim:—

1. An attachment of the character described comprising a substantially straight body made of a material having spring qualities, a clamping member carried by the body at one end thereof, a catch member consisting of a straight shank portion having an integral hook portion, a releasing member having a straight shank portion and a downwardly inclined portion formed integrally therewith, said second named shank portion being shorter than the shank portion of the catch member, and means for attaching both shank portions to the body adjacent to the end of the latter opposite that provided with the clamping member, and in substantial alinement with the body.

2. An attachment of the character described comprising a substantially straight body made of a material having spring qualities, a clamping member carried by the body at one end thereof, a catch member consisting of a straight shank portion having an integral hook portion, a releasing member having a straight shank portion and a downwardly inclined portion formed integrally therewith, said second named shank portion being shorter than the shank portion of the catch member, and means for attaching both shank portions to the body adjacent to the end of the latter opposite that provided with the clamping member, and in substantial alinement with the body, and a weight carried by the body adjacent to the end thereof provided with the said catch and releasing members.

3. An attachment for automotive vehicles comprising a longitudinal body made of a resilient material and adapted at its one end for attachment to a fixed part of the vehicle, a hook at the other end of the body for engaging a portion of the clutch control lever of the vehicle when the lever has been depressed, and a releasing member rigid with the body in adjacent relation to the hook for guiding the engaged portion of the clutch control lever out of engagement with the hook when the clutch control lever is further depressed under the impact of a sharp blow.

FRANK FREDERICK WUNDER.